Sept. 1, 1959 C. S. PETERSON, JR 2,902,652
CASE FOR ELECTRICAL INSTRUMENTS
Filed June 6, 1955 2 Sheets-Sheet 1
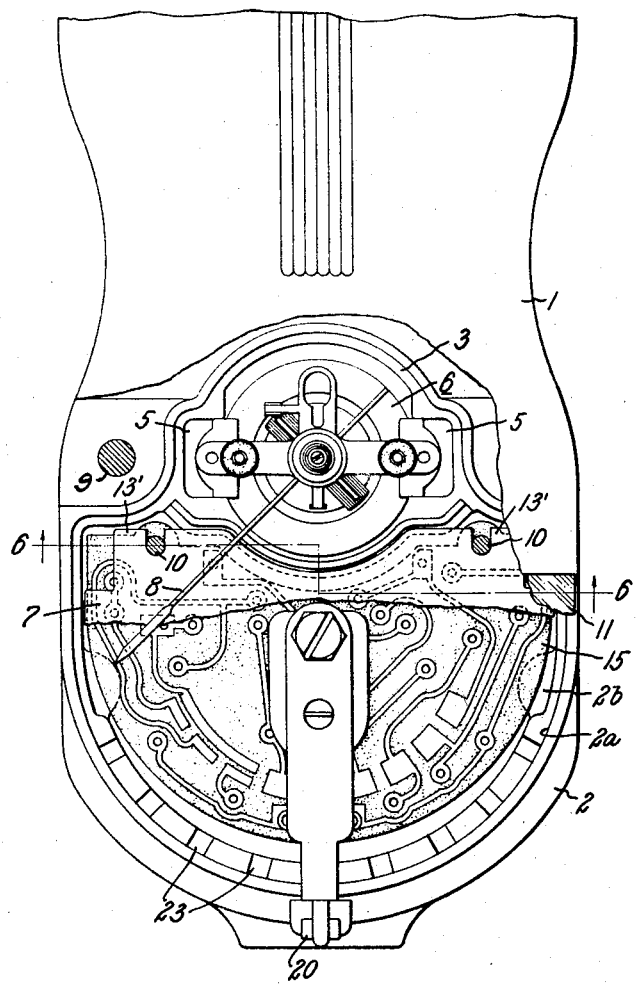
INVENTOR
CHARLES S. PETERSON JR.
BY *Rudolph J. Smick*
ATTORNEY Sept. 1, 1959     C. S. PETERSON, JR     2,902,652
CASE FOR ELECTRICAL INSTRUMENTS
Filed June 6, 1955     2 Sheets-Sheet 2
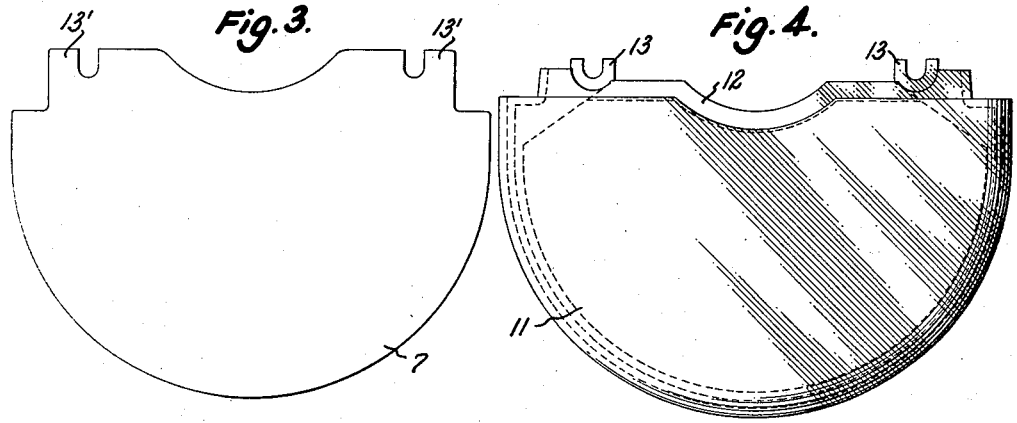
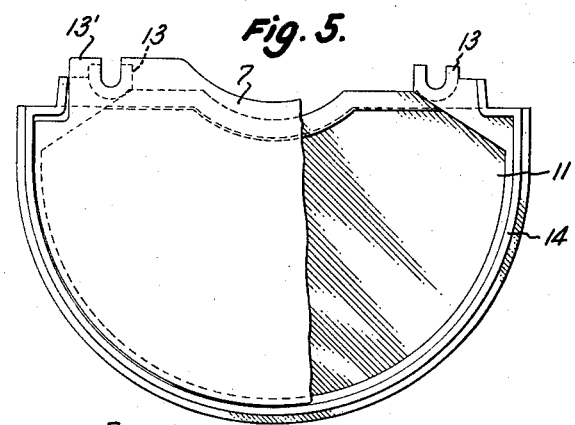
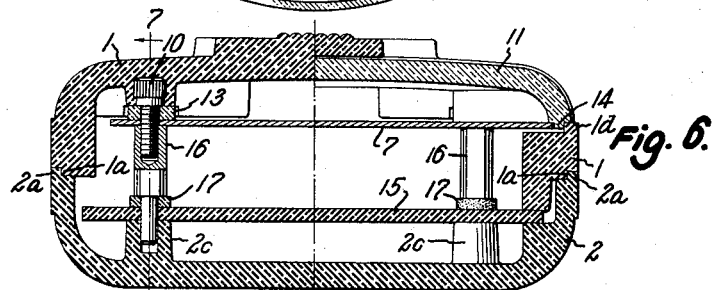
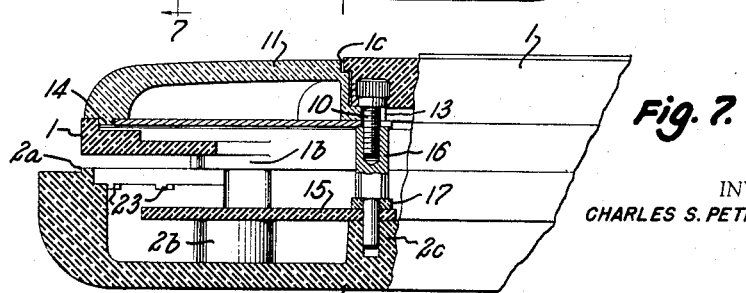
INVENTOR
CHARLES S. PETERSON JR.
BY Rudolph J. Jurick
ATTORNEY

United States Patent Office 2,902,652
Patented Sept. 1, 1959

2,902,652

CASE FOR ELECTRICAL INSTRUMENTS

Charles S. Peterson, Jr., Verona, N.J., assignor, by mesne assignments, to Daystrom, Incorporated, Murray Hill, N.J., a corporation of New Jersey Application June 6, 1955, Serial No. 513,195

1 Claim. (Cl. 324—156)

This invention relates to a case for electrical instruments and more particularly to the construction and mounting of a window for the case and to the structural arrangements for supporting an instrument scale plate and a range changing switch within the case.

Various constructions have been employed for mounting the elements of a multirange electrical measuring instrument within a case and, in general, the prior constructions have been relatively complex since they included screw connections for anchoring each element within the case.

An object of this invention is the provision of an instrument case which is made up of sections so constructed as to support many of the internal elements by the assembly of the case sections upon each other.

An object of this invention is the provision of an instrument case formed of two complementary sections of molded plastic and a transparent window fitted into one molded section and retained therein by the assembly of the case sections on each other.

An object of this invention is the provision of sectional cases for multirange instruments, one case section having studs embedded therein for support of the instrument scale plate and the several elements of a range changing switch.

These and other objects and the advantages of the invention will be apparent from the following specification when taken with the accompanying drawings illustrating an embodiment of the invention. It is to be understood that the drawings are for the purpose of illustration and are not to be construed as defining the scope or the limits of the invention, reference being had for the latter purpose to the appended claim.

In the drawings wherein like reference numerals denote like parts in the several views:

Figure 1 is a fragmentary front elevation of an electrical instrument having a case embodying the invention, the window and part of the front case section being broken away;

Figure 2 is a side elevation of the instrument with parts shown in substantially central longitudinal section;

Figure 3 is a rear elevation of the instrument scale plate;

Figure 4 is a front elevation of the window;

Figure 5 is an inside view of the window and scale plate, part of the scale plate being broken away;

Figure 6 is a transverse section on line 6—6 of Figure 1 but with the switch blade omitted; and Figure 7 is a fragmentary side elevation of the case, with parts in section on line 7—7 of Figure 6.

For purpose of illustration, the invention is shown with reference to a combined multirange volt-ammeter but it is to be understood that some features of the invention may be employed in the construction of cases for simpler forms of electrical measuring instruments.

In the drawings, the reference numerals 1 and 2 identify, respectively, the domed front and rear case sections preferably of a molded opaque plastic. The illustrated case is of broad hour-glass shape and the edges 1a, 2a of the front and rear sections are rabbetted to mate around the periphery of the case, see Figure 6, except where the front case section is cut back, as indicated at 1b in Figures 2 and 7, to provide clearance inwardly of an inner web portion connecting the rims of the front case section, beneath the lower end 1c of the outer part of said front case section, for the handle of a range-change switch which will be described hereinbelow. The front and rear case sections have integral, curved ribs 3 and 4 which mate to form the upper portion, as viewed in Figures 1 and 2, of an approximately cylindrical recess, with lateral extensions 5, in which a magnetic core type of direct current instrument mechanism 6 is seated. The lower portion 4' of the rib of the rear case section 2 extends outwardly into the front case section to provide a portion of an enclosure for the instrument mechanism but there is no corresponding lower section of rib 3 of the front case section since an opening must be left for free movement of the instrument pointer 8. The free edge of the rib portion 4' is notched, as shown in Fig. 2, to form an inset and seat the upper portion of the scale plate flush with its front surface and provide a shoulder preventing undesired upward movement thereof. The forward ends of studs 9 are embedded in the front case section 1, and the studs extend through openings, not shown, in the rear section 2 to receive nuts to hold the case in assembled relation.

The lower end of the case is approximately semicircular, as shown in Figure 1, and the lower end 1c of the outer part of the front case section terminates in a line extending substantially transversely of the case somewhat below the studs 9. The outer ends of a pair of threaded studs 10 are embedded in the front case section 1 and have inwardly projecting threaded ends, see Figures 1, 6 and 7.

An approximately semi-circular transparent domed window 11 of glass, or preferably of a transparent plastic, has an inner lip 12 which fits beneath the lower end 1c of the front section 1, and integral projections 13 which are notched to receive the studs 10. The window 11 has an integral bead 14 extending medially of its outer edge within which the scale plate 7 fits, and the scale plate has notched projections 13' which fit upon the studs beneath the projections 13 of window 11. The lower edge 1d of the front section 1 is cut back to provide a seat for the lower edges of the scale plate 7 and the window 11, see Figures 2 and 6.

The contacts of a range-change switch are carried by, and preferably printed on, a plate 15 of insulating material which rests upon lateral enlargements 2b of the inner wall of rear case section 2 and on hollow bosses 2c which are aligned with the studs 10. Posts 16 are threaded upon the studs 10 to secure the scale plate 7 and window 11 to the front case section, and the posts have lower ends which pass through resilient washer 17 and openings in plate 15 to enter the hollow bosses 2c, thereby to anchor the plate 15 within case section 1 in predetermined orientation. The resistors 18 of the range-change network are mounted on the back of the insulating plate 15, and the switch blade 19 and its handle 20 are pivotally mounted on a post 21 which is supported by the plate 15. A spring finger 22 is secured to the handle 20 to engage in indexing notches 23 molded in the rear case section 2.

The lower end of the case section 2 is provided with a web 24 in which a pair of terminal plugs 25 are embedded and project into a socket 26 for connection to leads, not shown, for use in voltage measurements. Spring clips 27 are secured to the terminals 25 in position to engage connectors 28 which pass through the plate 15 to establish circuit connections to selected contacts of the range-change network.

The case is assembled by placing the front case section 1 face down on a table, securing the scale plate 7 and window 11 to the front case section by threading the posts 16 on the studs 10, placing the washers 17 and switch plate 15 upon the projecting ends of posts 16, inserting the instrument 6 with care in its socket in the front case section to make certain that the pointer 8 is not bent and is freely movable in the space between the scale plate 7 and the window 11, fitting the rear case section 2 upon the studs 9, and applying nuts to the studs 9 to hold the case in assembled relation.

Claims to certain of the features herein described and illustrated are presented in the co-pending applications of Francis X. Lamb, Serial Nos. 513,428, filed June 6, 1955, now Patent No. 2,842,739, and 513,490, filed June 6, 1955, and it is to be understood that the inventions as recited in the following claim may be employed in the construction of cases for simpler types of instruments than the one herein disclosed.

I claim:

An instrument case for mechanism with a pointer comprising front and rear sections with rims extending respectively from front and rear parts thereof toward one another for mating engagement, the front part of the front case section terminating at a line extending transversely of the case so as to expose the mechanism pointer to view through an opening framed by an arcuate portion of the rim of said front case section and said front part, said arcuate portion being spaced from the rear section to leave clearance for the handle of a range-change switch and having a raised edge part, integral front and rear section ribs projecting toward one another for mating engagement to form one side of a recess for said mechanism, a rib on the rear case section extending forwardly into the front case section to define the opposite side of said recess for said mechanism and terminating in a ledge notched to form an inset for supporting the upper edge portion of a substantially semicircular scale plate for said instrument and preventing undesired upward movement thereof, a transparent domed window with an arcuate edge portion seated on said arcuate case portion for closing said opening, studs having heads embedded in said front case section, the inner face of said window being provided with an internal bead extending medially of its inner edge to fit within the raised edge part of the arcuate portion of the rim of said front case section, in combination with said scale plate which has a notched upper edge to fit about said studs and an outer edge to seat within said bead of the window, said window at its top edge being in front substantially flush with the front case section and terminating in a rearwardly offset lip underlying the portions of said front case section adjacent said top edge, notched portions projecting from said lip and fitting said studs, and posts threaded upon said studs and against said scale plate to secure the same and said window to said front case section, a range-change switch within said case, said range-change switch including a plate of insulating material having contacts thereon, and openings therethrough for receiving the ends of said posts to position said plate within said case.

References Cited in the file of this patent

UNITED STATES PATENTS

| | | |
|---|---|---|
| 1,702,416 | Rutter | Feb. 19, 1929 |
| 2,663,845 | Koch | Dec. 22, 1953 |
| 2,792,549 | Bernreuter | May 14, 1957 |